(No Model.)
J. F. SMITH.
STUMP EXTRACTOR.
No. 432,094. Patented July 15, 1890.
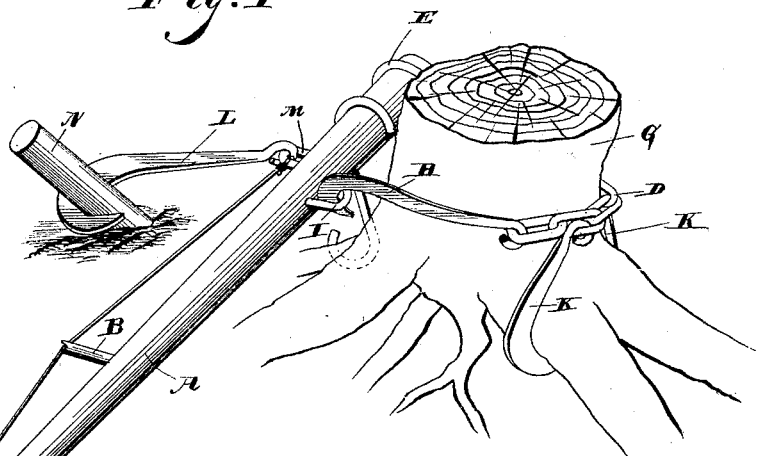
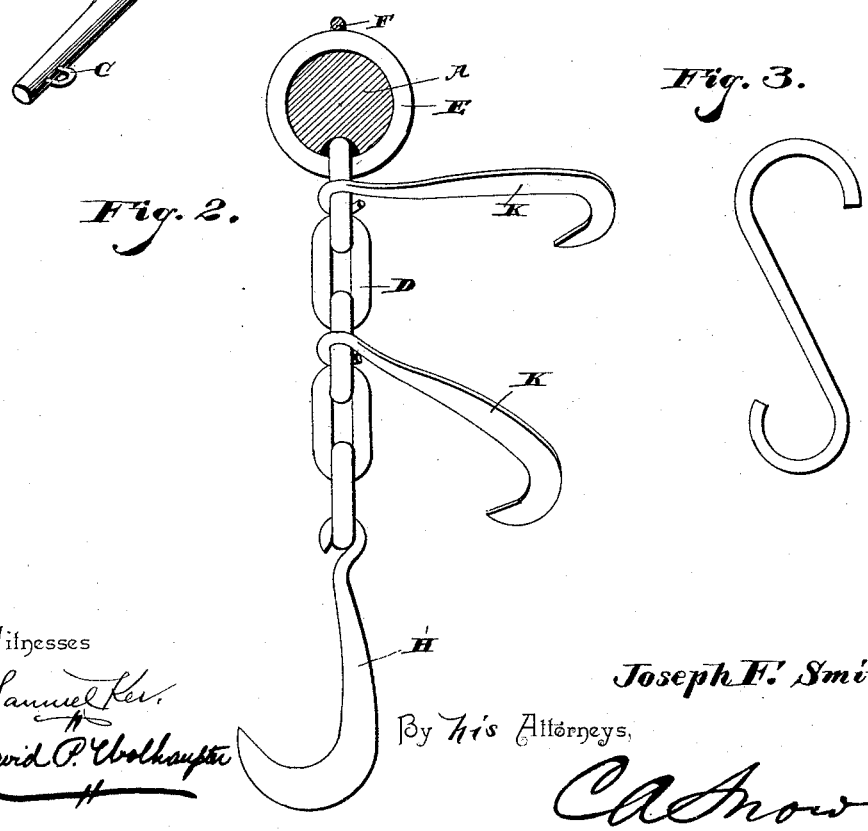
Witnesses
Samuel Ker
David P. Wolhaupter
Inventor
Joseph F. Smith.
By his Attorneys,
C. A. Snow & Co.

UNITED STATES PATENT OFFICE.

JOSEPH FLORA SMITH, OF GREAT CACAPON, WEST VIRGINIA.

STUMP-EXTRACTOR.

SPECIFICATION forming part of Letters Patent No. 432,094, dated July 15, 1890.

Application filed May 20, 1890. Serial No. 352,510. (No model.)

*To all whom it may concern:*

Be it known that I, JOSEPH FLORA SMITH, a citizen of the United States, residing at Great Cacapon, in the county of Morgan and State of West Virginia, have invented a new and useful Stump-Extractor, of which the following is a specification.

My invention has reference to a machine for extracting stumps in the clearing of land. The object of my invention is to provide a machine which by the application of a moderate power will uproot and dislodge stumps of trees from the ground; and it consists of a novel combination and arrangement of hooks on the end of a lever and of other features hereinafter more fully described, and particularly pointed out in the claim.

Referring to the accompanying drawings, Figure 1 represents a perspective view of a stump-extractor constructed in accordance with my invention. Fig. 2 is a plan view of the stump-attaching chain and hooks, and Fig. 3 is a detail of S-shaped lever-holding hook.

Like letters of reference indicate corresponding parts in the several figures.

A represents a lever constructed of a material suitable for the nature of the work, and is additionally strengthened by the use of an ordinary truss B, which is aranged on the side of the lever on which the strain occurs. Lever A is provided at its draft-attaching end with a suitable clevis C, to which a singletree, whiffletree, or windlass-rope can be attached in the working of the machine. To the opposite end of lever A a short heavy chain D is secured thereto by means of a metal ring E, encircling said lever and held in place by a staple F. Chain D is of a length sufficient to encircle trees of a variety of sizes and in use is adapted to pass around the stump G and to be fastened to the lever by means of a detachable hook H, engaging in the links of said chain and with an eyebolt I, firmly bolted in lever A, thereby holding the chain tightly in position around the circumference of the stump. Chain D is further provided with supplemental hooks K, that engage with the spare roots of the trees that are exposed by the customary ditching around a stump preparatory to the extraction thereof. Links of said chain may be provided with as many hooks as may be necessary, being either increased or diminished in number as the work is either light or heavy, and therefore depending in number entirely upon the character of the stumps to be extracted. On the side opposite the stump a hook L is secured to the lever by an eyebolt M and is attached at its hook end to a stake N, driven in the ground and firmly braced, or to other rigid fastenings—such as an adjacent stump, which is preferable—thereby placing the fulcrum of the lever A at the eyebolt M, which attaches said hook to lever.

To provide against the possibility of the chain D slipping over the top of the stump while the machine is in operation and against a general derangement of hooks therefrom, I use an S-shaped steadying-hook, which passes over the lever A between eyebolt I and chain-attaching end of said lever and engages with the roots of the stump, thereby holding all parts in position on the stump while the lever is in employment.

In operating my machine chain D is passed around stump G and is secured to lever A and held in position around the stump by means of hook H. Hooks K are then placed in position on convenient roots in indentations or unevennesses of the stump, and after the fulcrum-hook L is securely positioned the power is applied at the clevis end of the lever. By the arrangement of hooks and chain a moderate force suffices to uproot and tear the stumps to be extracted from the ground.

Having described my invention, what I claim, and desire to secure by Letters Patent, is—

In a stump-extractor, the combination of a lever, a stump-encircling chain attached to one end of said lever, passing around the stump, and attached to the lever again by a detachable hook connecting a link of said chain and an eyebolt in lever, stump-engaging hooks attached to links of said chain, a fulcrum-hook secured to said lever on the side opposite the stump, and an S-shaped steadying-hook, all arranged and combined substantially as and for the purpose set forth.

In testimony that I claim the foregoing as my own I have hereto affixed my signature in presence of two witnesses.

JOSEPH FLORA SMITH.

Witnesses:
 IRVIN A. DAWSON,
 LEWIS ALLEN, Jr.